Jan. 12, 1965 C. F. COOK 3,164,988
DETERMINING THE NATURE OF GEOLOGICAL FORMATIONS
Filed July 14, 1961 2 Sheets-Sheet 2

INVENTOR.
C. F. COOK
BY *Hudson & Young*
ATTORNEYS

United States Patent Office 3,164,988
Patented Jan. 12, 1965

3,164,988
DETERMINING THE NATURE OF GEOLOGICAL
FORMATIONS
Charles F. Cook, Bartlesville, Okla., assignor to Phillips
Petroleum Company, a corporation of Delaware
Filed July 14, 1961, Ser. No. 124,074
6 Claims. (Cl. 73—154)

This invention relates to a method and apparatus for determnning the nature of geological formations. In another aspect, it relates to a method and apparatus for logging a well bore traversing subsurface geological formations to determine the nature thereof, such as porosity. In another aspect, it relates to a method and apparatus for logging a well bore traversing subsurface geological formations to locate water-bearing formations and to delineate such formations from other formations, such as possible oil and/or gas producing formations.

In oil and gas exploration and recovery operations, it is useful to have information regarding the nature of subsurface geological formations penetrated or traversed by a well bore. It is particularly desirable to locate in a well bore possible oil and/or gas producing formations and to delineate the same from water-bearing formations. Well bores traversing such formations have been located in the past in several ways in an attempt to determine the nature of such formations, particularly the depth of possible oil and/or gas producing formations. One such method involves mechanically taking continuous core samples or sidewall samples, which method is obviously slow and expensive, with the data obtained thereby not always being reliable. Another method is to run an electrical or resistivity survey, but the data obtained thereby is often difficult to correlate with actual formation porosity or other parameters indicative of the true nature of formations. Radioactive logs have also been used, but much needs to be developed in this area to make this method commercially feasible and reliable. Thus, there has arisen a need for a method of logging a well to delineate possible oil and/or gas producing formations from other formations, such as water-bearing formations.

Accordingly, an object of this invention is to provide an improved method of determining the nature of geological formations. Another object is to provide an improved method and apparatus for logging a well penetrating subsurface geological formations to locate possible under oil and/or gas producing formations and delineate the same from other formations. Another object is to provide an improved method and apparatus for logging a well to locate water-bearing formations and thereby delineate the same from producing formations. Further objects and advantages of this invention will become apparent to those skilled in the art from the following discussion, appended claims and accompanying drawings in which:

My invention resides in a method and apparatus for logging a well bore penetrating subsurface geological formations, comprising steps of and means for running in such well bore a special tool and generating in this tool high radio frequency radiation, directing this radiation into the formations encompassing an uncased portion of the well bore, thereby converting a portion or all of the emitted high radio frequency radiation into heat energy, measuring a property of said formations before and after the radiation is passed into the formations, such as the effective rise in temperature caused by such heating of the formations, and indicating said measured property, such as temperature rise, as a function of depth in said well bore as an index of the nature of such formations.

The high radio frequency energy directed into the formations penetrated by the well bore is transformed into heat energy due to the increase in electron activity of the substances in the formation under the influence of the radiant energy. Formations having different water content will absorb different amounts of the radio frequency radiation and generate different amounts of heat energy. The amount of radio frequency energy at a constant power and constant frequency which can be passed through a substance can be expressed in terms of dielectric constant. The higher the dielectric constant, the greater the amount of radio frequency energy being transformed into heat energy. Water has a dielectric constant of 80(20° C., $10^8$ cycles/sec.), crude oil about $2(2\times 10^7$ cycles/sec.) gas (methane) about $1(0°$ C., $3\times 10^6$ cycles/sec.), and reservoir rock about $12(10^6$ cycles/sec.). By passing the radio frequency through the formations penetrated by the well bore while running or moving the radio frequency energy source in the well bore, preferably at a constant rate, e.g., 20 to 100 feet per minute, and measuring a property of the formations, such as the temperatures of the various formations, both before and after the same have been subjected to the radio frequency radiation, it is possible by noting the measured property, such as differential temperature, to locate water-bearing formations and delineate the same from other formations, such as possible oil and/or gas formations. The magnitude of the differential temperature is directly proportional to the water content of the formation and the magnitude of this water content is in turn directly proportional to the porosity of such formation, whether the water in said formation is fresh or salt water, whether it is connate water or water which invaded the formation from the well bore, and whether the water in such formation presents a continuous or broken path to the radio frequency energy. Of course, porosity values are among the most useful of all formation parameters.

Figure 1:
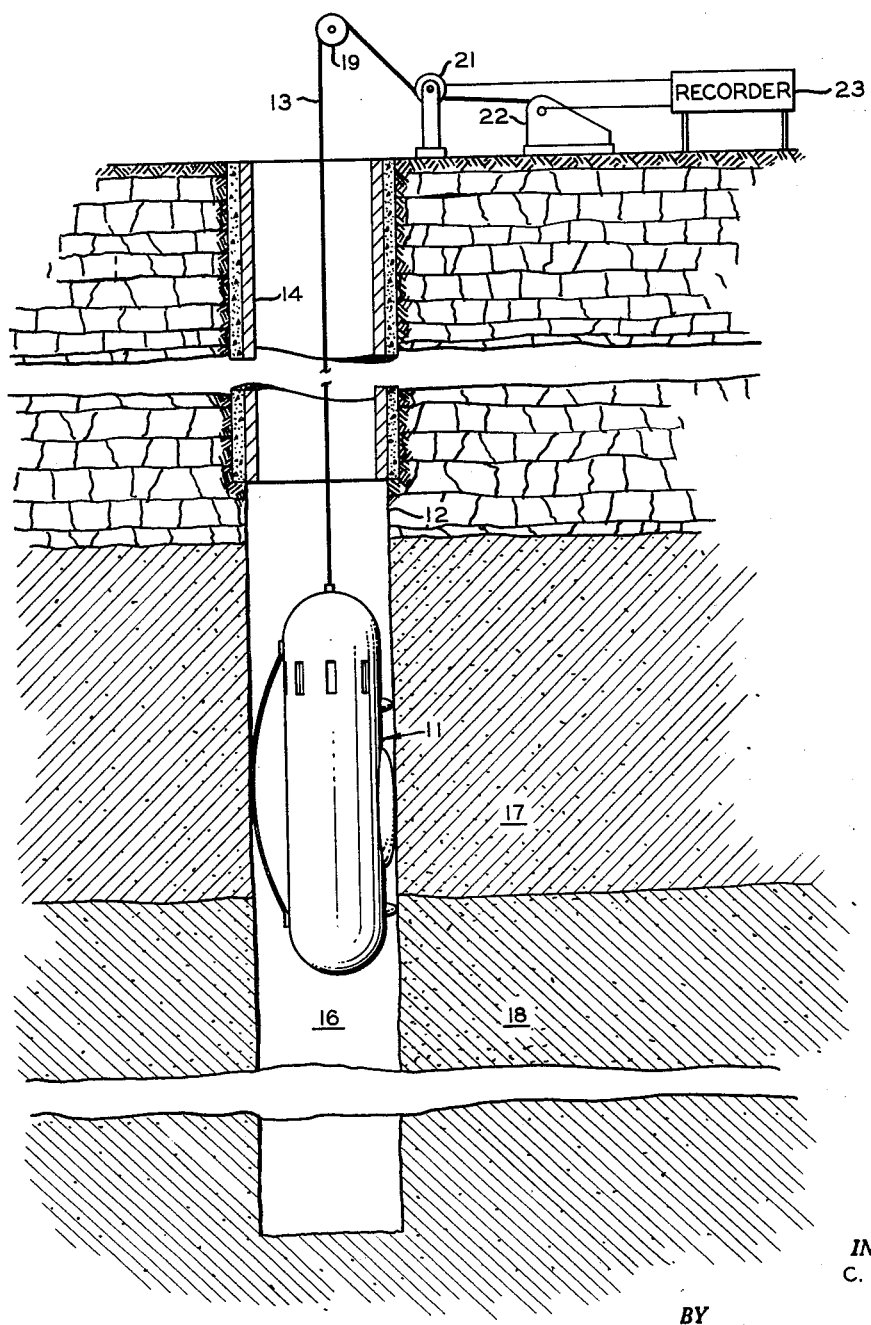
FIGURE 1 is a sectional view of a portion of the earth's surface penetrated by a well bore and means associated therewith to determine the nature of such formations according to this invention.

Referring now to the drawing, and to FIGURE 1 initially, there is illustrated a well logging assembly or well tool generally designated 11 which is suspended within a well bore 12 by armored cable 13. The upper end of the well bore 12 is provided with the usual surface casing, simply shown and designated 14 in the drawing, and the lower end of the well bore comprises an uncased portion 16 which is surrounded and defined by various subsurface geological formations under examination, such as water-bearing formation 17 and oil-bearing formation 18. The upper end of cable 13 passes over a sheave 19 and thence downwardly along a depth indicating sheave 21 to suitable hoisting and power equipment 22. Rotation of sheave 21 provides a means for indicating the depth of the well tool 11, which information is passed in a conventional manner to a recorder 23, the strip chart of which is driven in a conventional manner by sheave 21. The hoist means 22 is provided with slip rings or the like so that electrical connections are made from the conductors within the cable 13 to the recorder 23.

Figure 2:
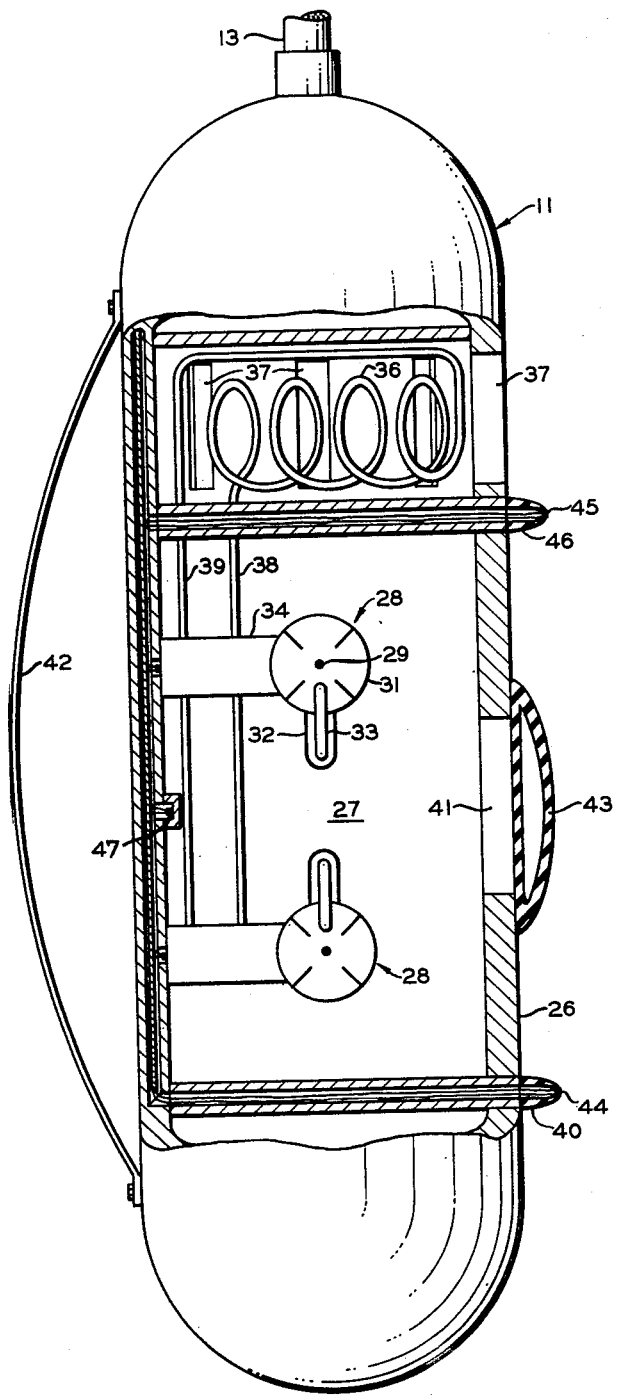
FIGURE 2 is a detail view in elevation and partial cross section of the well tool shown in FIGURE 1.

Looking now at FIGURE 2, the well tool of FIGURE 1 is shown in detail. It comprises a cylindrical casing 26 encompassing a radiation chamber 27 in which are disposed one or more radio frequency generators, such as one or more magnetrons 28. Such magnetrons are well known in the art and are oscillators which generate ultra high frequencies, the frequencies used in this invention preferably ranging from about 2,000 to about 3,000 megacycles, or higher. As diagrammatically shown in FIGURE 2, each magnetron 28 comprises a cathode 29 surrounded by a vane-type anode 31 having a plurality of cavities. The anode 31 can have mounted thereon a glass envelope 32 into which protrudes from one of the cavities an antenna 33. Because of the temperatures generated by the magnetrons, it is necessary to cool the same, and for that purpose the magnetron is provided with a base 34 having provision for cooling fluid to enter therein. Cooling of the magnetrons 28 can be effected in any suitable manner, for example, by providing a cooling coil 36 in the upper end of the tool, which coil can be cooled upon contact with fluid in the bore hole by passage of the same through suitable openings 37 in the casing 26, the cooling liquid within the coils circulating through the magnetrons by convection through pipes 38, 39. The casing is provided with a window or opening 41 adjacent the radiation chamber 27 to permit radio frequency radiation emanating from the antennae 33 of the magnetron 38 to be passed into the formations encompassing the encased portion of the bore hole. To minimize the effects of fluid in the bore hole, should such exist, the tool 11 can be provided with a bow spring 42 on one side and an inflated sleeve 43 adjacent to and covering the opening 41 on the other side. This assembly forces the tool 11 against the face of the well bore, in contact with the formations traversed thereby. Tool 11 is also provided with a pair of temperature sensitive transducers 44, 45, such as thermocouples on thermistors, protected by rubber bumpers 40, 46, or the like, at opposite ends of the tool for the purpose of measuring the temperature of wall of the well bore at two spaced apart points during the running of the log in the well bore. The tool can also be provided with a thermometer means to measure the actual temperature of the various formations, although illustration of this is omitted from the drawing in the interest of brevity. These measurements are transmitted via cable 13 to recorder 23 at the surface. A differential temperature detector circuit suitable for this purpose is disclosed in the Oil and Gas Journal, July 14, 1958, page 124.

Figure 3:
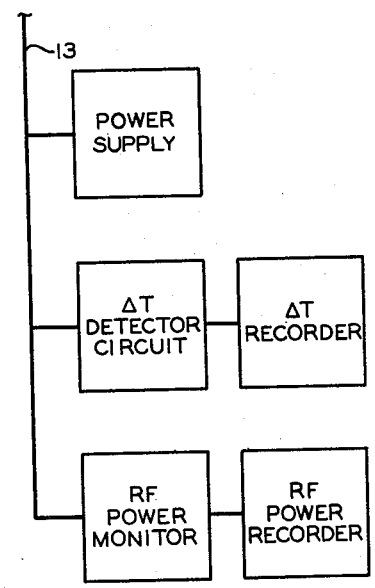
FIGURE 3 is a view diagrammatically illustrating certain means associated with the well tool of FIGURE 2.

The various means for supplying electric power to the tool 11 and means for transmitting measurements back to the surface of the earth will be obvious and are known to those skilled in the art and are schematically illustrated in FIGURE 3. It is necessary to supply the anode heater circuit of the magnetrons with high direct current voltage, e.g., 2,000 to 10,000 volts. This high voltage can be supplied to the tool 11 from the ground surface by the cable 13, or low direct current voltage can be supplied from the surface to the tool by the cable and this low voltage changed to high direct current voltage by means of a conventional converter, the latter procedure being preferred to minimize line losses and coupling effects where great depths are being investigated. Low direct current voltage or operating current is also supplied from the ground surface to the cathodes 29 of the magnetrons 28. It is desirable to provide within the radiation chamber 27 a temperature sensing transducer, designated 47 in FIGURE 2, in order to monitor the radio frequency radiation generated within the radiation chamber, so that sufficient radiation can be assured and malfunction of the radiation equipment can be detected. This information can be transmitted to radiation frequency power monitor means at the surface of the ground. Radio frequency power monitor means useful for this purpose is disclosed in U.S. Patent 2,437,449.

In operation, tool 11 is lowered on cable 13 within the well bore 12. High radio frequency is generated within the radiation chamber 27 during the descent of the tool 11 in the uncased portion 16 of the well bore. As the tool 11 is lowered, transducers 44 and 45 monitor the temperature at the face of the well bore, the lower transducer 44 detecting the temperature before the irradiation of the formations and thermistor 45 detecting the formation temperatures after such irradiation. The differential temperature is indicated by the recorder 23 at the surface, along with the depth of the tool 11 in the well bore. As the tool 11 moves past water-bearing zone 17, a material increase in the temperature of this formation will result because of the presence of water. As the tool 11 moves past the boundary between water-bearing formation 18, there will be indicated a noticeable decline in the differential temperature, and when the tool 11 reaches a depth opposite that of formation 18, there will be a minimum if any differential temperature indicated due to the comparatively negligible or absence of water in formation 18. The greater the amount of water in the water-bearing formation 17, the greater the heat generated due to the greater absorption of the high radio frequency radiation. The magnitude of the differential temperature will be directly proportional to the porosity of the water-bearing formation.

It should of course be evident that the logging operation can be carried out by lowering the tool 11 to a depth opposite the lowermost point in the well bore under investigation, and then gradually raising the tool 11 in the well bore while subjecting the formations encompassing the well bore to the high radio frequency energy; in such case, transducer 45 will detect temperatures of the formations before irradiation, and transducer 44 will detect the temperatures of the formations after such irradiation.

Recorder 23 can indicate directly the differential temperature and correlate this with the depth measurement, so that there will be an instantaneous means for locating water-bearing formations. From a knowledge of the same, the depth and location of possible oil and/or gas formations can be thereafter located with precision by other conventional means.

Various modifications and alterations of this invention will become apparent to those skilled in the art without departing from the scope and spirit of this invention, and this invention is not to be limited unduly to that set forth herein for illustrative purposes.

I claim:

1. A method of logging a well bore penetrating subsurface geological formations, comprising the steps of lowering into said well bore a source of radio frequency radiation, generating radio frequency radiation from said source in said well bore while vertically moving said source therein, directing said generated radio frequency radiation into subsurface geological formations, measuring the temperatures of said formations before and after said radio frequency radiation is passed into said formations.

2. A method of logging a well bore penetrating subsurface geological formations, comprising the steps of lowering into said well bore a source of radio frequency radiation, generating ultra-high radio frequency radiation from said source in said well bore while vertically moving said source therein at a constant rate of travel, directing said generated radio frequency radiation into subsurface geological formations surrounding an uncased portion of said well bore, measuring the rise in temperature of said formations occasioned by said irradiation thereof, and correlating said temperature measurement with the depth of said source in said well bore as an index of the water content of said formations.

3. The method according to claim 2 wherein said generated radio frequency radiation is in the range of about 2,000 to about 3,000 megacycles.

4. A method of logging a well bore penetrating subsurface geological formations, comprising the steps of lowering into said well bore a source of radio frequency radiation, generating ultra-high radio frequency radiation from said source at a constant rate in said well bore while vertically moving said source therein at a constant rate of travel, directing said generated radio frequency radiation into subsurface geological formations surrounding an uncased portion of said well bore, measuring the temperature of said formations before and after said irradiation as said source is moved vertically within said well bore, correlating said temperature measurement with the depth of said source in said well bore as an index of the water content of said formations, and using said correlation to delineate water-bearing formations from other subsurface geological formations.

5. Apparatus for logging a well bore penetrating subsurface geological formations, comprising: a well tool; means to lower and raise said well tool within said well bore; means for sensing the depth said well tool is lowered in said well bore; said well tool comprising means for generating radio frequency radiation in said well bore, means for directing said generated radiation into subsurface geological formations penetrated by said well bore, and means for sensing the temperatures of said formations before and after said irradiation; and means connected to said depth sensing means and said temperature sensing means for correlating the depth of said tool with said temperatures as an index of the nature of said formations.

6. Apparatus for logging a well bore penetrating subsurface geological formations, comprising: a well tool; means to lower and raise said well tool within said well bore; means to sense the depth said well tool is lowered in said well bore; said well tool comprising magnetron means for generating radio frequency radiation in said well bore, means for directing said generated radiation into subsurface geological formations penetrated by said well bore, and means for sensing the temperature of said formations before and after said irradiation as said well tool is moved vertically within said well bore at a constant rate of travel; and means connected to said depth sensing means and said temperature sensing means for correlating the depth of said tool and said temperature as an index of the water content of said formations.

References Cited in the file of this patent
UNITED STATES PATENTS

| | | |
|---|---|---|
| 2,352,247 | Blau et al. | June 27, 1944 |
| 2,455,941 | Muskat et al. | Dec. 14, 1948 |
| 2,757,738 | Ritchey | Aug. 7, 1956 |
| 3,044,010 | Jones et al. | July 10, 1962 |
| 3,113,087 | Codrington | Dec. 3, 1963 |